United States Patent [19]

Shaw et al.

[11] Patent Number: 4,515,431
[45] Date of Patent: May 7, 1985

[54] FIBER OPTIC AMPLIFIER

[75] Inventors: Herbert J. Shaw; Marvin Chodorow, both of Stanford; Michel J. F. Digonnet, Menlo Park, all of Calif.

[73] Assignee: The Board of Trustees of the Leland Stanford Junior University, Stanford, Calif.

[21] Appl. No.: 407,136

[22] Filed: Aug. 11, 1982

[51] Int. Cl.³ .............................................. G02B 5/172
[52] U.S. Cl. ........................................ 350/96.15; 372/6
[58] Field of Search ............ 350/96, 15, 96.16; 372/6, 94

[56] References Cited

U.S. PATENT DOCUMENTS

| | | | |
|---|---|---|---|
| 3,456,211 | 7/1969 | Koester | 372/6 |
| 3,957,341 | 5/1976 | Taylor | 350/96.15 |
| 4,136,929 | 1/1979 | Suzaki | 350/96.15 |
| 4,243,297 | 1/1981 | Elion | 350/96.15 |
| 4,258,336 | 3/1981 | Fletcher et al. | 372/6 X |
| 4,300,811 | 11/1981 | Ettenberg et al. | 350/1.1 |
| 4,301,543 | 11/1981 | Palmer | 350/96.15 X |
| 4,307,933 | 12/1981 | Palmer et al. | 350/96.16 |
| 4,315,666 | 2/1982 | Hicks, Jr. | 350/96.15 |
| 4,335,933 | 6/1982 | Palmer | 350/96.19 |
| 4,342,499 | 8/1982 | Hicks, Jr. | 350/96.15 |
| 4,343,532 | 8/1982 | Palmer | 350/96.19 |
| 4,362,359 | 12/1982 | Dammann et al. | 350/96.19 |
| 4,383,318 | 5/1983 | Barry et al. | 372/6 |

FOREIGN PATENT DOCUMENTS

| | | | |
|---|---|---|---|
| 38023 | 10/1981 | European Pat. Off. | |
| 53-91752 | 8/1978 | Japan | 350/96.15 |
| 55-76308 | 6/1980 | Japan | 350/96.15 |
| 1094639 | 12/1967 | United Kingdom | |

OTHER PUBLICATIONS

Bergh et al, "Single-Mode Fibre Optic Directional Coupler"; *Electronics Letters*, vol. 16, No. 7, Mar. 1980, pp. 260-261.

Periasamy et al, "Laser Amplification in an Optical Fiber by Evanescent Field Coupling"; *Applied Physics*, vol. 24, No. 3, Mar. 1981, pp. 201-203.

Injeyan et al., "Light Amplification by Evanescent Wave Coupling in a Multimode Fiber"; *Applied Optics*, vol. 21, No. 11, Jun. 1982, pp. 1928-1932.

Kapany et al., J. of the Optical Society of America, vol. 58, No. 9, Sep. 1968, "Coherent Interactions Between Optical . . . ", pp. 1176-1183.

Michel Digonnet, et al., "Analysis of a Tunable Single Mode Optical Fiber Coupler", *IEEE Journal of Quantum Electronics*, vol. QE-18, No. 4, Apr. 1982, pp. 746-753.

*Primary Examiner*—John Lee
*Attorney, Agent, or Firm*—Knobbe, Martens, Olson & Bear

[57] ABSTRACT

An optical fiber bidirectional amplifier includes a pair of small diameter optical fibers, arranged in a side-by-side configuration, the first fiber providing a pumping source and the second fiber doped with a material which will lase at the frequency of the signal to be amplified. The signal to be amplified propagates through the second fiber to stimulate emission of coherent light from the lasing material, resulting in amplification of the signal. The refractive indexes of the first and second fibers are substantially identical, but the coupling characteristic provided by the geometrical relationship between the pair of fibers yields a wavelength dependent coupling efficiency. Specifically, the coupling efficiency at the wavelength of the pumping source is relatively high, while the coupling efficiency at the wavelength of the signal to be amplified is relatively low. Thus, the pumping illumination is coupled from the first fiber to the second fiber to stimulate the doping material in the second fiber, while the signal to be amplified remains relatively uncoupled, and is amplified by the coherent light emitted by the lasing material.

14 Claims, 12 Drawing Figures

FIBER OPTIC AMPLIFIER

The U.S. Government has rights in this invention pursuant to contract F49620-80-C-0040 awarded by the U.S. Air Force Office of Scientific Research.

BACKGROUND OF THE INVENTION

The concept of optical amplifiers, based upon the lasing capability of certain materials, particularly on a macroscopic level, is well known. Thus, for example, it is known to place a pumping light source and a single crystal neodymium-ytrium aluminum garnet (ND:YAG) rod, several millimeters in diameter and several centimeters in length, in a tubular reflective cavity. For example, the light source and ND:YAG rod may be located, respectively, to extend along the two foci of a cavity having an elliptical cross-section. In such an arrangement, light emitted by the light source and reflected from the cavity walls will impinge upon the ND:YAG rod. The light source is preferably selected to emit wavelengths corresponding to the absorption spectra of the ND:YAG crystal so that the energy states of the neodymium ions of the crystal are inverted to an energy level above the upper lasing level. After inversion, an initial relaxation of the neodymium ions through phonon radiation yields an ion population at the upper lasing level. From the upper lasing level, the ions will lase, to a lower energy level, emitting light of a wavelength which is characteristic of the ND:YAG material. Advantageously, this lower energy level is above the ground level for the ions so that a rapid, phonon-emitting relaxation will occur between this lower energy level and the ground level, enabling a high inversion ratio to continue to exist between the upper lasing level and this lower energy level within the pumped ions.

With the population so inverted, as is well known from laser technology, the ND:YAG will also provide a very slow fluorescence, that is, random emission of incoherent light. This spontaneous radiation, however, has a minimal effect on the amplifying rod, since the average lifetime of ions in the inverted state is 230 microseconds.

If, after the neodymium ions of the ND:YAG rod have been inverted, a light signal at the lasing frequency is transmitted through the rod, the light signal will trigger the lasing transition of the neodymium ions, causing coherent emission of stimulated radiation, which will effectively add to the transmitted signal, thus amplifying this signal.

The absorption length of the pumping illumination within the ND:YAG crystal (i.e., the length of material through which the illumination must traverse before 60% of the illumination is absorbed) is typically in the range between 2 and 3 millimeters, and thus the ND:YAG crystals used in amplifying structures have had diameters at least this large so that the crystal could absorb a substantial portion of the pumping radiation during the initial reflection from the cavity walls and passage through the crystal. If, during this initial traverse through the crystal, the pumping illumination is not absorbed, it is likely to be reflected by the cavity walls back to the light source, where it will be reabsorbed, generating heat in the light source and reducing the overall efficiency of the amplifier.

When such amplifiers are used in fiber optic systems, it has been thought necessary to use optical components, such as lenses, to focus light from the optical fiber into the ND:YAG rod, and the amplified light signal from the ND:YAG rod back into another fiber. Such optical systems require careful alignment and are susceptible to environmental changes, such as vibration and thermal effects. Additionally, the optical components and the size of the ND:YAG rod make the amplifying system relatively large, and thus impractical for certain applications. Furthermore, the relatively large size of the ND:YAG rod introduces beam wander within the rod. Thus, the signal from the input fiber optic element will traverse different paths through the rod, a characteristic which is temperature related and varies with time, so that the output light may be lost due to the fact that the output fiber will accept only light within a small acceptance angle. Thus, as the beam within the ND:YAG rod wanders, the output signal may vary in an uncontrollable manner. Furthermore, the large size of the ND:YAG rod requires a large amount of input energy in order to maintain a high energy density within the rod. Such large pump power requires high output pump light sources, generating substantial heat which must be dissipated, typically by liquid cooling of the cavity.

While amplifiers of this type are useful in many applications, such as some communications applications, use in a recirculating fiber optic gyroscope puts severe restrictions upon the amplification system. With such gyroscopes, optical fiber, typically a kilometer or more in length, is wound into a loop, and a light signal is recirculated within the loop, typically in both directions. Motion of the loop causes a phase difference between the counter-propagating light signals which may be used to measure gyroscope rotation. It is advantageous, because the phase shift induced in one rotation is relatively small and because periodic outputs relating to rotation are required, to recirculate input light within the loop as many times as possible.

In traversing a kilometer of optical fiber, an optical signal will typically lose 30 to 50 percent of its intensity. An amplifier, if capable of amplifying the bidirectional counter-propagating light signals, would permit a light signal to propagate many times within the loop, if the amplifier were placed in series with the loop, and provided a gain of 2 to 3 db.

Unfortunately, the relatively large size, high power requirements caused by relatively inefficient performance, beam wander effects, and cooling requirements of prior art ND:YAG rod amplifiers, as described above, makes such amplifiers relatively impractical for high accuracy gyroscopes. These factors, of course, also limit the utility of such amplifiers in other applications, such as communication networks.

SUMMARY OF THE INVENTION

These disadvantages associated with crystal rod amplifiers are alleviated in the present invention. This invention permits both the pumping source fiber and the doped amplifying medium to be small diameter optical fibers These fibers are positioned together in close proximity to form an optical coupler. The indices of refraction of the pump fiber and the amplifier fiber are as nearly as possible identical. With such an arrangement, and with the spacing between the pump fiber and amplifier fiber properly adjusted, and with a carefully selected interaction length between these fibers, the optical coupler will provide a high coupling efficiency at the wavelength of the pumping source but a low coupling efficiency at the wavelength of the signal to be amplified. This results in a coupling of the pumping illumination into the doped amplifying fiber, but substantially eliminates loss to the optical signal which is to be amplified, since this signal is not coupled into the pumping fiber.

Because the present invention permits the pumping wavelength to be coupled into the signal fiber for guiding within the signal fiber, the diameter of the ND:YAG signal fiber need not exceed the absorption length since the pumping illumination is effectively absorbed in a direction along the axis of the ND:YAG fiber rather than perpendicular to that axis, once the pumping illumination has been coupled to this fiber. Thus, pumping illumination can be continuously supplied to the amplifying ND:YAG fiber without interfering with its signal carrying characteristics. Furthermore, because a four-port coupler is used for coupling the pumping illumination to the amplifying fiber, the ends of the amplifying fiber are available for direct signal coupling to the optical fibers within the optical fiber system.

BRIEF DESCRIPTION OF THE DRAWINGS

These and other advantages of the present invention are best understood through reference to the drawings in which.

DETAILED DESCRIPTION OF THE PREFERRED EMBODIMENT

Figure 1:
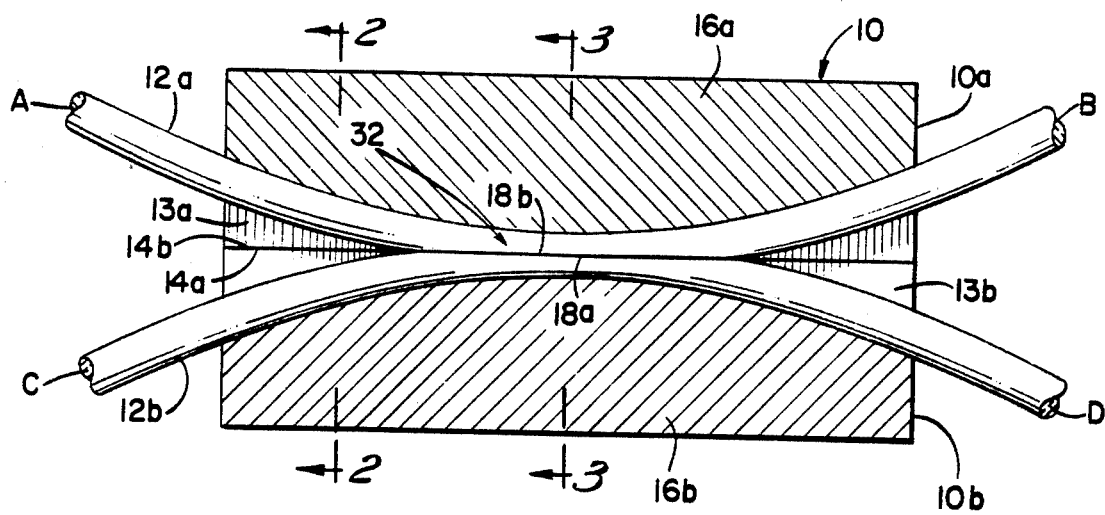
FIG. 1 is a cross-sectional view of the fiber optic coupler used as a multiplexer in the present invention, showing a pair of fiber optic strands mounted in respective arcuate grooves of respective bases.
Figure 2:
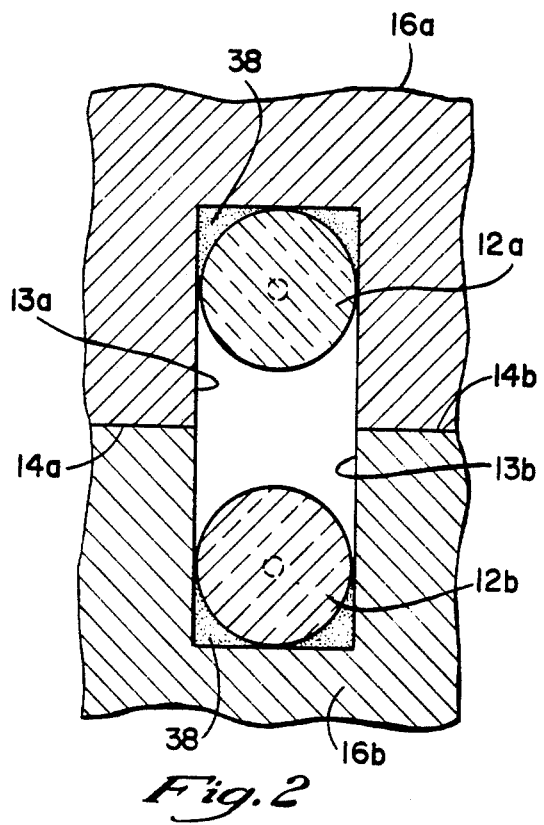
FIGS. 2 and 3 are cross-sectional views of the coupler of FIG. 1, taken along lines 2—2 and 3—3, respectively.
Figure 3:
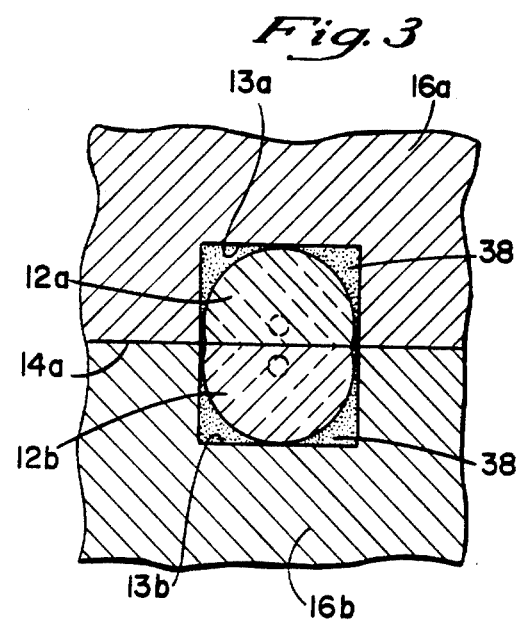
Figure 4:
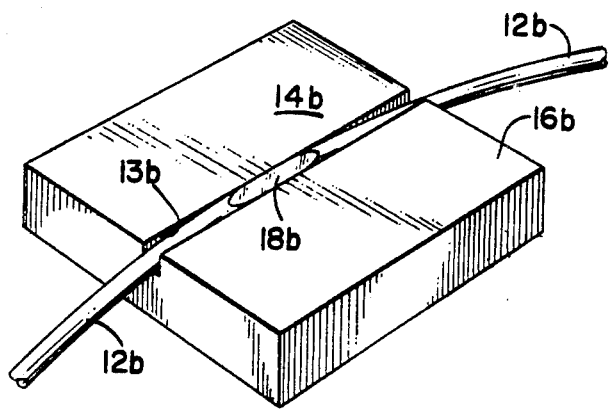
FIG. 4 is a perspective view of the lower base of the coupler of FIG. 1 separated from the other base to show its associated fiber mounting and the oval-shaped facing surface of the fiber.

In order to gain a detailed understanding of the operation of the fiber optic amplifier of this invention, it is necessary to understand the manner in which a fiber optic coupler can be constructed to selectively couple a first optical frequency while not coupling a second optical frequency. The apparatus, as well as methods for constructing the apparatus, required for such selective coupling, are disclosed in copending patent application entitled "Passive Fiber Optic Multiplexer", filed in the U.S. Patent Office Nov. 9, 1981, bearing Ser. No. 319,301, and listing Herbert J. Shaw and Michel J. F. Digonnet as inventors. That application is assigned to the assignee of the present invention. That application is hereby incorporated herein by reference. Nonetheless, the principal characteristics of that device and its method of manufacture are described below.

This invention utilizes a passive multiplexer which utilizes a fiber optic coupler. This coupler 10 is illustrated in FIGS. 1–4, and includes two strands 12A and 12B of a single mode fiber optic material mounted in longitudinal arcuate grooves 13A and 13B, respectively, formed in optically flat confronting surfaces 14A and 14B, respectively, of rectangular bases or blocks 16A and 16B, respectively. The block 16A with the strand 12A mounted in the groove 13A will be referred to as the coupler half 10A and the block 16B with the strand 12B mounted in the groove 13B will be referred to as the coupler half 10B.

Each of the strands 12A and 12B comprise an optical fiber which is doped to have a central core and an outer cladding. One of the strands, 12A for example, may comprise a commercially available fiber of quartz glass which is doped to have a central core and an outer cladding. The other strand, 12B for example, may comprise ND:YAG crystal which is likewise doped to have a central core and an outer cladding. The index of refraction of the fibers 12A and 12B should be as nearly as possible identical, and both of the strands 12A and 12B should include a central core which is sufficiently small to provide single mode fibers at the optical frequencies to be used. Thus, these strands 12A and 12B typically have a core diameter on the order of 10 microns or less and a cladding diameter on the order of 125 microns. In the embodiment disclosed, the diameter of the strands 12 and their respective cores are exaggerated. As will be understood in more detail from the description which follows, the ND:YAG fiber 12B is used to transmit the signal to be amplified while the quartz fiber 12A is used to couple pumping illumination to the ND:YAG fiber 12B. For this reason, the fiber 12B will be referred to as the signal fiber while the fiber 12A will be referred to as the pumping fiber.

The arcuate grooves 13A and 13B have a radius of curvature which is very large compared to the diameter of the fibers 12, and have a width slightly larger than the fiber diameter to permit the fibers 12, when mounted therein, to conform to a path defined by the bottom walls of the grooves 13. The depth of the grooves 13A and 13B varies from a minimum at the center of the blocks 16A and 16B, respectively, to a maximum at the edges of the blocks 16A and 16B, respectively. This advantageously permits the fiber optic strands 12A and 12B, when mounted in the grooves 13A and 13B, respectively, to gradually converge toward the center and diverge toward the edges of the blocks 16A,16B, thereby eliminating any sharp bends or abrupt changes in direction of the fibers 12 which may cause power loss through mode perturbation. In the embodiment shown, the grooves 13 are illustrated as being rectangular in cross-section, however, it will be understood that other suitable cross-sectional contours which will accommodate the fibers 12 may be used alternatively, such as a U-shaped cross-section or a V-shaped cross-section.

At the centers of the blocks 16, in the embodiment shown, the depth of the grooves 13, which mount the strands 12, is less than the diameter of the strands 12, while at the edges of the blocks 16, the depth of the grooves 13 is preferably at least as great as the diameter of the strands 12. Fiber optic material was removed from each of the strands 12A and 12B to form the respective oval-shaped planar surfaces 18A, 18B, which are coplanar with the confronting surfaces 14A, 14B, respectively. These surfaces 18A, 18B will be referred to herein as the fiber "facing surfaces". Thus, the amount of fiber optic material removed increases gradually from zero towards the edges of the block 16 to a maximum towards the center of the block 16. This tapered removal of the fiber optic material enables the fibers to converge and diverge gradually, which is advantageous for avoiding backward reflection and excess loss of light energy.

In the embodiment shown, the coupler halves 10A and 10B are identical, except in regard to the material which forms the strands 12A, 12B, and are assembled by placing the confronting surfaces 14A and 14B of the blocks 16A and 16B together, so that the facing surfaces 18A and 18B of the strands 12A and 12B are in facing relationship.

An index matching substance (not shown), such as index matching oil, is provided between the confronting surfaces 14. This substance has a refractive index approximately equal to the refractive index of the cladding, and also functions to prevent the optically flat surfaces 14 from becoming permanently locked together. The oil is introduced between the blocks 16 by capillary action.

Figure 5:
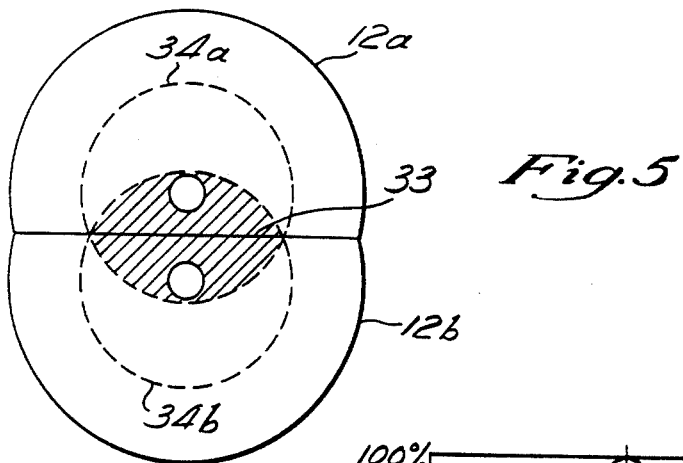
FIG. 5 is a schematic diagram showing the evanescent fields of the pair of fibers overlapping at the interaction region.

An interaction region 32 is formed at the junction of the strands 12, in which light is transferred between the strands by evanescent field coupling. It has been found that, to insure proper evanescent field coupling, the amount of material removed from the fibers 12 must be carefully controlled so that the spacing between the core portions of the strands 12 is within a predetermined "critical zone". The evanescent fields extend into the cladding and decrease rapidly with distance outside their respective cores. Thus, sufficient material should be removed to permit each core to be positioned substantially within the evanescent field of the other. If too little material is removed, the cores will not be sufficiently close to permit the evanescent fields to cause the desired interaction of the guided modes, and thus, insufficient coupling will result. Conversely, if too much material is removed, the propagation characteristics of the fibers will be altered, resulting in loss of light energy due to mode perturbation. However, when the spacing between the cores of the strands 12 is within the critical zone, each strand receives a significant portion of the evanescent field energy from the other strand, and good coupling is achieved without significant energy loss. The critical zone is illustrated schematically in FIG. 5 as including that area, designated by the reference numeral 33, in which the evanescent fields, designated by reference numerals 34A and 34B, of the fibers 12A and 12B, respectively, overlap with sufficient strength to provide coupling, i.e., each core is within the evanescent field of the other.

The blocks or bases 16 may be fabricated of any suitable rigid material. In one presently preferred embodiment, the bases 16 comprise generally rectangular blocks of fused quartz glass approximately 1 inch long, 1 inch wide, and 0.4 inch thick. In this embodiment, the fiber optic strands 12 are secured in the slots 13 by suitable cement 38, such as epoxy glue. One advantage of the fused quartz blocks 16 is that they have a coefficient of thermal expansion similar to that of glass fibers, and this advantage is particularly important if the blocks 16 and fibers 12 are subjected to any heat treatment during the manufacturing process. Another suitable material for the block 16 is silicon, which also has excellent thermal properties for this application.

Operation of the Coupler 10

The coupler 10 includes four ports, labeled A, B, C, and D in FIG. 1. When viewed from the perspective of FIG. 1, ports A and C, which correspond to strands 12A and 12B, respectively, are on the left-hand side of the coupler 10, while the ports B and D, which correspond to the strands 12A and 12B, respectively, are on the right-hand side of the coupler 10. For the purposes of discussion, it will be assumed that input light is applied to port A. This light passes through the coupler and is output at port B and/or port D, depending upon the amount of power that is coupled between the strands 12. In this regard, the term "normalized coupled power" is defined as the ratio of the coupled power to the total power. In the above example, the normalized coupled power would be equal to the ratio of the power at port D to the sum of the power output at ports B and D. This ratio is also referred to as the "coupling efficiency", and when so used is typically expressed as a percent. Thus, when the term "normalized coupled power" is used herein, it should be understood that the corresponding coupling efficiency is equal to the normalized coupled power times 100. In this regard, tests have shown that the coupler 10 has a coupling efficiency of up to 100%. However, it will also be seen that the coupler 10 may be "tuned" to adjust the coupling efficiency to any desired value between zero and the maximum.

Furthermore, the coupler 10 is highly directional, with substantially all of the power applied at one side of the coupler being delivered to the other side of the coupler. The coupler directivity is defined as the ratio of the power at port D to the power at port C, with the input applied to port A. Tests have shown that the directionally coupled power (at port D) is greater than 60 db above the contra-directionally coupled power (at port C). Further, the coupler directivity is symmetrical. That is, the coupler operates with the same characteristics regardless of which side of the coupler is the input side and which side is the output side. Moreover, the coupler 10 achieves these results with very low throughput losses. The throughput loss is defined as the ratio of the total output power (ports B and D) to the input power (port A) subtracted from one (i.e., $1-(P_B+P_D)/P_A$). Experimental results show that throughput losses of 0.2 db have been obtained, although losses of 0.5 db are more common. Moreover, these tests indicate that the coupler 10 operates substantially independently of the polarization of the input light applied.

The coupler 10 operates on evanescent field coupling principles in which guided modes of the strands 12 interact, through their evanescent fields, to cause light to be transferred between the strands 12. As previously indicated, this transfer of light occurs at the interaction region 32. The amount of light transferred is dependent upon the proximity and orientation of the cores, as well as the effective length of the interaction region 32. As will be described in detail below, the amount of light transferred is also dependent of the wavelength of the light. The length of the interaction region 32 is, in turn, dependent upon the radius of curvature of the fibers 12, and, to a limited extent, the core spacing, although it has been found that the effective length of the interaction region 32 is substantially independent of core spacing. However, the "coupling length", i.e., the length within the interaction region 32 which is required for a single, complete transfer of a light signal from one fiber 12 to the other, is a function of core spacing, as well as wavelength. In one exemplary embodiment, employing an edge-to-edge core spacing of about 1.4 microns, and a radius of curvature on the order of 25 centimeters, the effective interaction region is approximately one millimeter long at a light signal wavelength of 633 nm. Because the coupling length at 633 nm is also one millimeter in such a coupler, the light makes only one transfer between the strands 12 as it travels through the interaction region 32. However, if the length of the interaction region 32 is increased, or core spacing decreased, a phenomenon referred to herein as "overcoupling" will occur, since the coupling length is shorter than the effective interaction length. Under these circumstances, the light will transfer back to the strand from which it originated. As the interaction length is further increased, and/or the core spacing further decreased, the effective interaction length becomes a greater multiple of the coupling length, and the light transfers back to the other strand. Thus, the light may make multiple transfers back and forth between the two strands 12 as it travels through the region 32, the number of such transfers being dependent on the length of the interaction region 32, the light wavelength (as described below), and the core spacing.

Since the coupling length in a single mode fiber coupler, as described in reference to FIGS. 1-4, shows a strong dependence on signal wavelength, as described in detail in the copending application incorporated above, it is possible with properly chosen geometrical parameters for the coupler 10, to totally couple one signal wavelength while a second signal wavelength remains essentially uncoupled. This phenomenon permits the combination of two signals fed into the ports on one side of the coupler 10. Thus, as shown in FIG. 1, if a pumping signal having a wavelength $\lambda_1$ is fed into port A of coupler 10, and a signal to be amplified, having a wavelength $\lambda_2$ is coupled to port C, and the geometry is properly selected, both signals can be combined at port D, with virtually no light output at port B.

Figure 6:
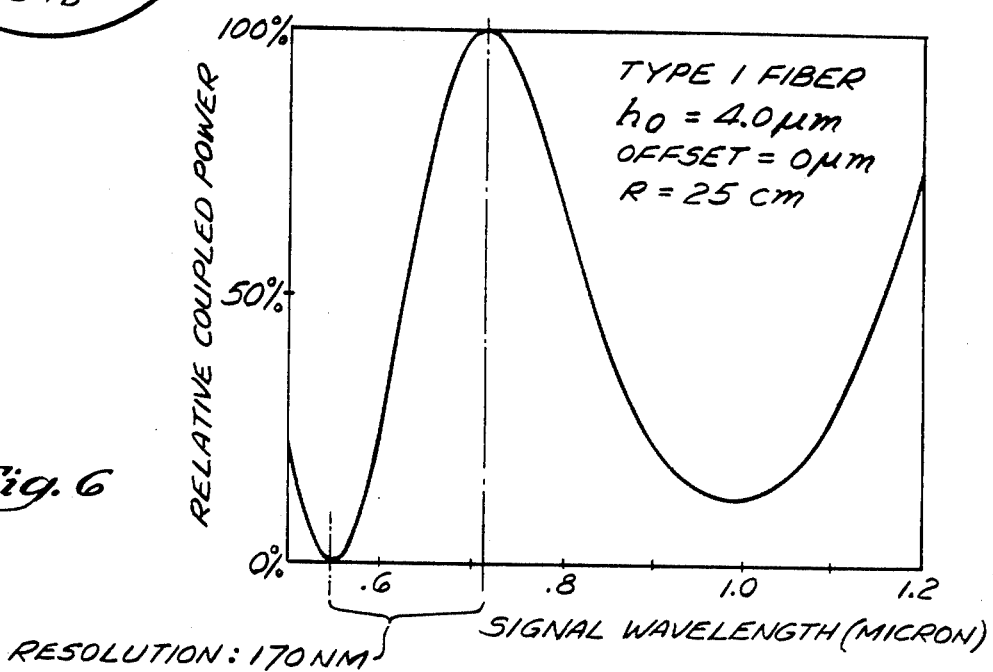
FIG. 6 is a chart showing relative coupled power versus signal wavelength for a type 1 fiber coupler having a minimum fiber spacing of 4 microns, an offset of 0 micron, and a fiber radius of 25 centimeters.

To illustrate this wavelength dependence, FIG. 6 provides a plot of coupled power versus signal wavelength in the visible and near infrared spectrum for a particular coupler geometry. Because for this coupler configuration the effective interaction length of the coupler is an odd multiple of the coupling length for the wavelength 720 nm, but an even multiple of the coupling length for the wavelength 550 nm, the wavelength 720 nm will be 100% coupled, while the wavelength 550 nm will be effectively uncoupled. With different efficiencies, different wavelengths may be combined or separated. For instance, 590 nm and 650 nm may be separated or combined at an 80% efficiency.

Virtually any pair of wavelengths ($\lambda_1$, $\lambda_2$) may be efficiently combined or separated so long as the effective interaction length is an even multiple of the coupling length for one wavelength and an odd multiple of the coupling length for the other wavelength. As the number of coupling lengths within the effective interaction length increases, the resolution of the multiplexer is enhanced. As is described in detail in the incorporated reference, the multiplexer resolution may be enhanced by increasing the radius of curvature of the fibers 12A, 12B. Provided that the interaction length of the coupler is large enough, virtually any two signals may be exactly mixed or separated, regardless of how closely spaced their wavelengths are.

Figure 7:
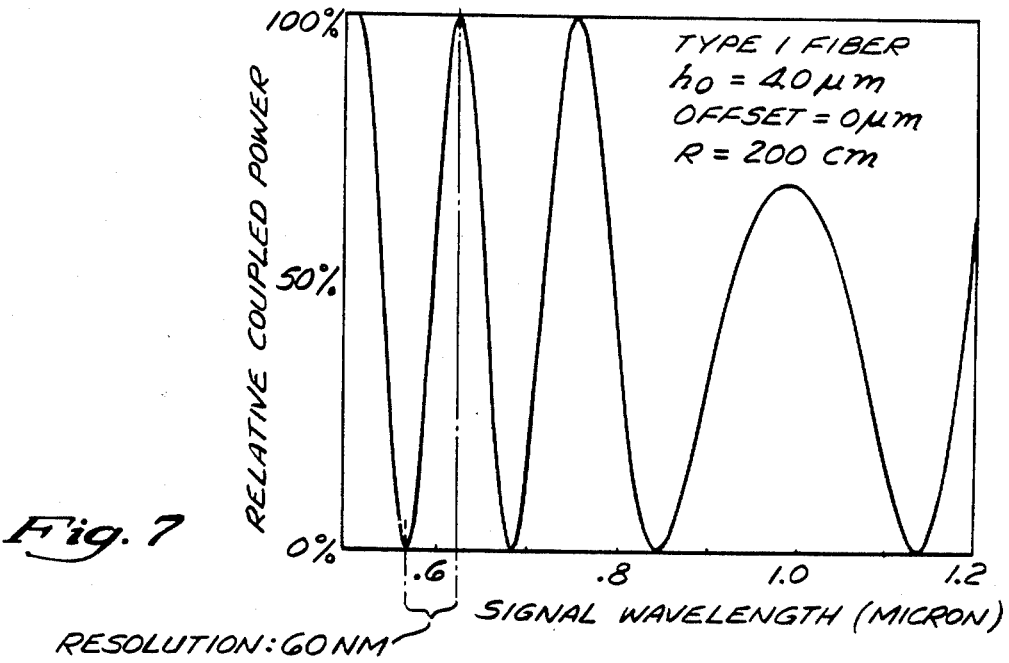
FIG. 7 is a chart of relative coupled power versus signal wavelengths similar to FIG. 6 but with a fiber radius of 200 centimeters.

The interaction length is a function of wavelength, and the resolution is approximately proportional to $(R)^{-\frac{1}{2}}$. As R increases, the effective interaction length increases, and becomes a higher multiple of the coupling length, improving resolution. This result is illustrated in FIG. 7, which is comparable to the graph of FIG. 6, except that the radius of curvature has been increased to 200 centimeters. As anticipated, this increase in radius improves the coupler resolution near $\lambda = 600$ nm from approximately 170 nm in the 25 centimeter radius example of FIG. 6 to approximately 60 nm in the 200 centimeter case.

The resolution of a multiplexing coupler depends on two independent parameters, H (fiber spacing) and R (radius of curvature of the fibers). For a given pair of signal wavelengths, efficient mixing may be achieved by first properly selecting a fiber spacing H for the coupler which yields a large wavelength dependence for the wavelengths of interest (choice of H), and then by selecting a radius of curvature which yields a resolution equal to the difference between the wavelengths (choice of R).

After the resolution of the coupler has been set in accordance with the wavelengths to be separated, the coupler may be tuned to precisely adjust the coupling lengths for the wavelengths of interest so that the effective interaction length is an even multiple of the coupling length of one wavelength and an odd multiple of the coupling length of the other wavelength. This is accomplished by offsetting the fibers by sliding the blocks 16A,16B (FIG. 1) relative to one another in a direction normal to the axis of the fibers 12A,12B. Such an offset has the effect of increasing the minimum fiber spacing H and increasing the effective radius of curvature of the fibers. If the required offset is small enough, it will not upset the multiplexer resolution. This stems from the fact that the separation H of a large radius coupler changes rapidly with fiber offset in comparison to changes in the effective radius of curvature with fiber offset.

Figure 8:
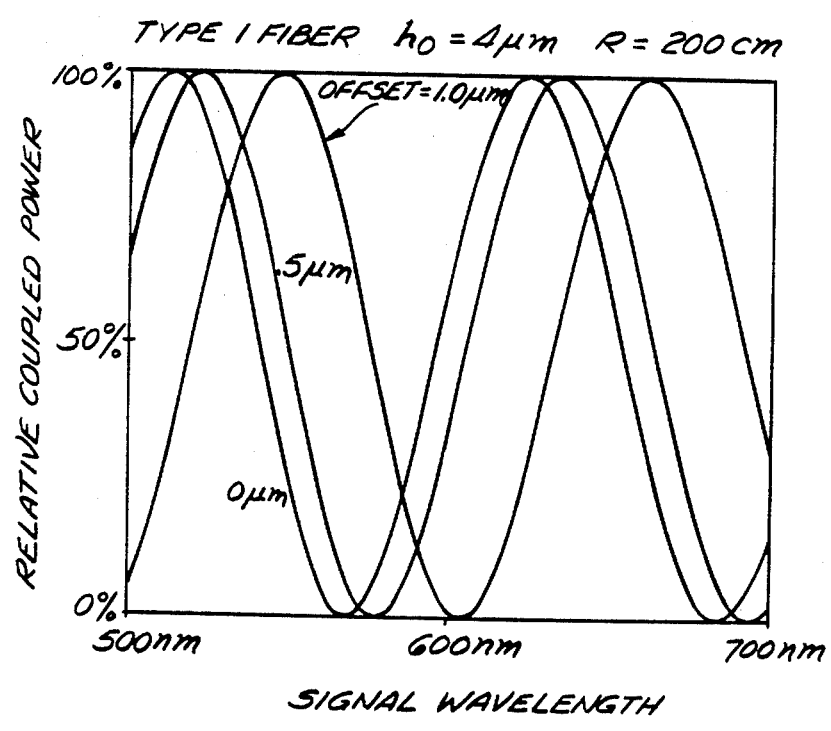
FIG. 8 is a chart of relative coupled power versus signal wavelength for a type 1 fiber coupler having a minimum fiber spacing of 4 microns, a fiber radius of 200 centimeters, and a selectable fiber offset.

To illustrate this tunability of multiplexing couplers, FIG. 8 provides a plot of relative coupled power versus wavelength for three increasing values of fiber offset (0 microns, 0.5 microns, and 1.0 microns). The curve is seen to shift toward increasing wavelengths as the offset increases, while the period of oscillation (or resolution) remains virtually unchanged. In this particular example (R = 200 cm, H = 4 microns), a 1-micron offset shifts the curve by approximately 45 nm.

ND:YAG Amplification

Figure 9:
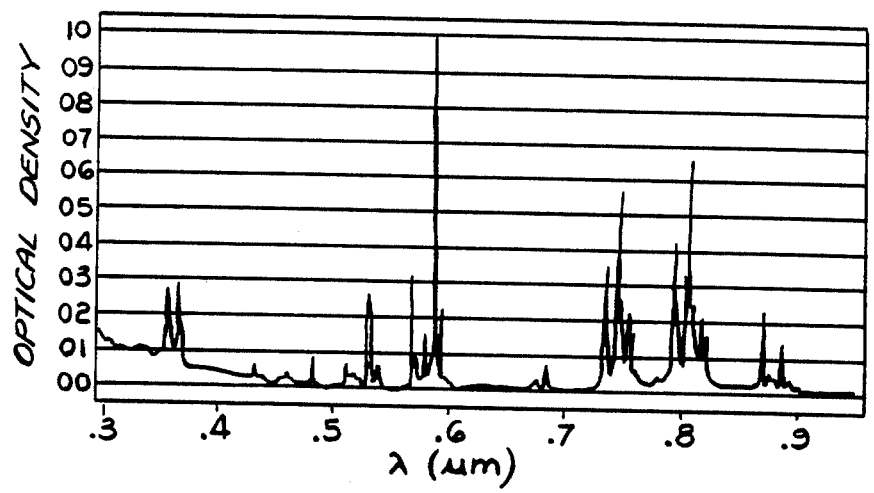
FIG. 9 is a diagram showing the absorption spectrum of ND:YAG at 300° K.

Referring now to FIG. 9, which is a diagram of the absorption spectrum of ND:YAG crystal at 300° K, it can be seen that the ND:YAG material has a relatively high optical density, and thus a short absorption length, at selected wavelengths. For this reason, it is advisable to select the wavelength of the pumping illumination in order to (a) maximize the absorption of the pumping illumination in the ND:YAG fiber 12B as opposed to the pumping fiber 12A, and (b) to permit the absorption length to be as short as possible. This will permit substantially complete absorption of the pumping illumination within a very short length of the signal fiber 12B. As can be seen from FIG. 9, the wavelength 0.58 microns is best suited for pumping illumination, although the wavelengths 0.75 and 0.81 microns are relatively well suited.

Figure 10A:
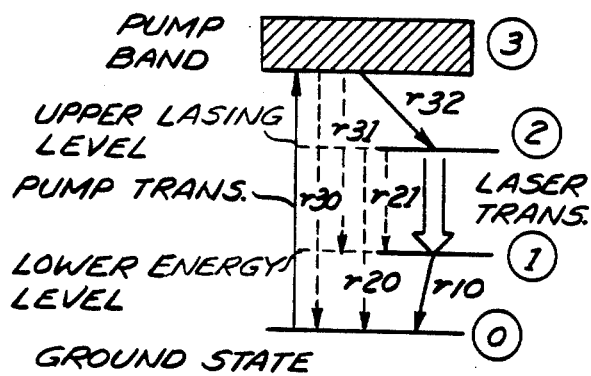
FIGS. 10a and 10b are simplified energy level diagrams of a four-level laser using a doped material, such as ND:YAG.
Figure 10B:
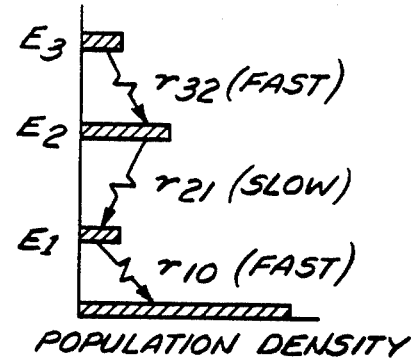

Referring now to FIG. 10A, which is an energy level diagram for the ND:YAG crystal from which the fiber 12B is formed, it will be understood that, when pump light at the absorption wavelength, described above, is absorbed by the ND:YAG crystal, the neodymium ions are excited from the ground state to the pump band. From the pump band, the ions quickly relax, through phonon interactions, to the upper lasing level. From this upper lasing level, the neodymium ions will undergo a relatively slow fluorescence to the lower energy level. From this latter level, a final, rapid phonon relaxation occurs to the ground state. This latter rapid relaxation in a four-level laser system of the type shown in FIG. 10A is advantageous, since the rapid phonon relaxation between the lower energy level and the ground state provides a practically empty lower energy level. This feature is shown in FIG. 10B, in which the population densities at the pump band, upper lasing level, lower lasing level, and ground state are shown for an ND:YAG fiber during continuous pumping. Because the rate of fluorescence between the upper lasing level and lower energy level is relatively slow in comparison with the phonon relaxation between the pump band and the upper lasing level, as well as between the lower energy level and the ground state, the population density at the upper lasing level is substantially higher than that at the lower energy level, yielding a high inversion ratio. The average lifetime of neodymium ions at the upper lasing level, prior to spontaneous fluorescence, is 230 microseconds.

An input light signal at the laser transition wavelength (1.064 microns), i.e., the wavelength of light emitted by the ND:YAG ions during relaxation between the upper lasing level and the lower energy level, traveling through the excited laser fiber 12B (FIG. 1) will trigger the emission of stimulated photons at the same frequency, coherent with the signal, and the signal is thereby amplified. Thus, the passage of light at this frequency will cause a photon emitting relaxation between the upper lasing level and lower energy level of FIG. 10A, in phase with the light signal to be amplified, yielding an effective gain for the input light signal.

The gain which can be achieved in the amplifier of this invention is dependent upon the density of the inverted neodymium ion population within the ND:YAG crystal. Initially, the ultimate inversion population is limited by the lattice structure of the YAG material itself, since the ND:YAG material replaces ytrium atoms with neodymium atoms in the crystal lattice. Only approximately 1 ytrium atom in each 100 ytrium atoms may be replaced by a neodymium ion without distorting the lattice structure of the ND:YAG material.

Theoretical calculations of the small signal gain $g_0$ of the amplifier of this invention can be made, using the relation $g_0 = \sigma \Delta N$, where $\sigma$ is the stimulated emission cross-section, for ND:YAG, $8.8 \times 10^{-19}$ cm$^2$, and $\Delta N$ is the population inversion density given by:

$$\Delta N = \frac{P_p}{V} \frac{\eta_1 \eta_2 t_{sp}}{h\nu} \quad (1)$$

where $P_p$ is the absorbed pump power, V is the crystal volume and thus, $P_p/V$ is the absorbed pump power per unit of fiber volume, $t_{sp}$ is the spontaneous radiative lifetime, that is, the 230-microsecond fluorescence relaxation time of the neodymium ions, $\eta_1$ is the effective spectral overlap of pump output with an ND:YAG absorption line, as shown in FIG. 9, $\eta_2$ is equal to the quantum efficiency of 1.06-micron fluorescence, namely 0.63, and $h\nu$ is equal to the energy of one pump photon.

Combining the above relationship provides:

$$g_0 = \sigma \frac{P_p}{V} \frac{\eta_1 \eta_2 t_{sp}}{h\nu} \quad (2)$$

for the dependence of gain on pump power. It should be recognized that the value $P_p$ is the absorbed pump power and that an increase in the length of the fibers does not necessarily increase the gain. Thus, if the pumping radiation is coupled completely to the ND:YAG fiber 12B, and travels in the fiber 12B a distance which is sufficient to permit this fiber 12B to completely absorb the pumping radiation, then the value $P_p$ in this equation may be replaced by the input power level. To obtain the net gain, however, one must subtract from $g_0$ the fiber propagation losses at 1.06 microns. A fiber loss of 100 db per kilometer would reduce the gain by only 0.001 db per centimeter. Thus, if the overall length of the fiber 12B can be maintained relatively short, while still absorbing substantially all of the input pump power, the propagation losses within the amplifier can be maintained at a low level.

Operation of the Amplifier

Figure 11:
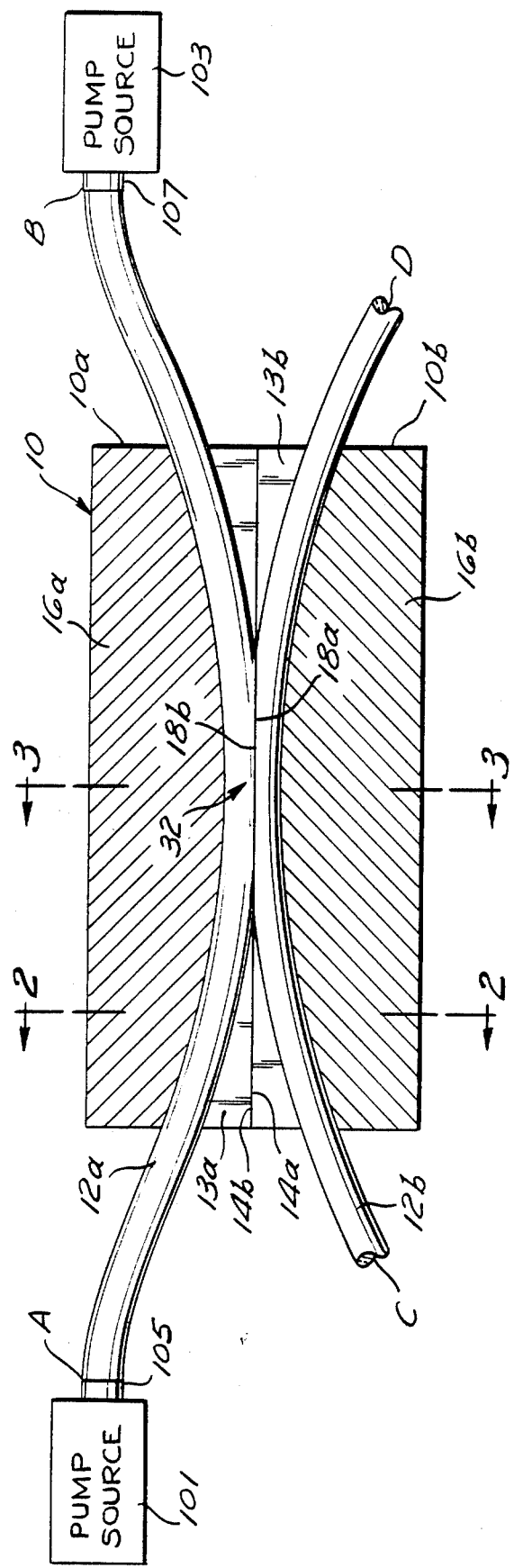
FIG. 11 is a sectional view of the amplifier of the present invention.

Referring now to FIG. 11, the manner in which the amplifier of the present invention utilizes the wavelength multiplexing properties of the coupler 10 to provide pumping illumination to energize the ND:YAG fiber 12B will be described.

A pair of pump sources 101, 103 are coupled to the opposite ends of the pumping fiber 12A. These pump sources 101, 103 may be, for example, long life LEDs, such as those currently available which operate at a current density of approximately 1,000 amps per centimeter squared, and have a radiance of approximately 5 watts/sr.cm$^2$. In fact, some LEDs have been reported with a radiance of approximately 50 watts/sr.cm$^2$. Because of the size differential between the single mode fiber 12A and these LEDs 101,103, lenses 105,107 may be useful in focusing the output of the LED source into the fiber 12A.

Alternatively, the pump sources 101,103 may be laser diodes which permit even higher concentrations of pump power in the fiber 12A.

Regardless of the type of pumping sources 101,103 utilized, the efficiency of the system will be enhanced if the wavelength of the radiation from these sources 101,103 corresponds with a peak in the absorption spectrum of the ND:YAG fiber 12B, shown in FIG. 9. Electro-luminescent diodes are commercially available with appropriate dopings to emit spectra in the 0.8-micron range which match quite well the absorption spectrum of room temperature ND:YAG material. For example, commercially available GaAlAs LEDs provide radiation spectra which are strong at the 0.8-micron region. Similarly, laser diode structures are commercially available which emit energy over the 0.8- to 0.85-micron range.

It will be recalled that the lasing frequency of the ND:YAG material of the fiber 12B is 1.06 microns. The multiplexing coupler 10 is thus fabricated for use in this invention to provide virtually complete coupling at the wavelength of the pumping sources 101,103, 0.8 microns in the above example, while providing substantially no coupling at the lasing frequency of the signal fiber 12B, 1.06 microns in this same example.

This selective coupling is accomplished, in accordance with the techniques described above, for properly selecting the fiber spacing H to yield a large wavelength dependence for wavelengths between 0.8 microns and 1.06 microns, and then by selecting a radius of curvature for the fibers 12A, 12B which yields a resolution equal to the difference between 1.06 and 0.8 microns, or 0.26 microns. After the resolution of the coupler has been set in this manner, the coupler may be tuned, as previously described, to adjust the coupling length for the wavelength 0.8 microns and 1.06 microns so that the effective interaction length is an even multiple of the coupling length for one of these pair of wavelengths and an odd multiple of the coupling length of the remaining wavelengths. In the example shown in FIG. 11, since it is desired to couple the output of the pump sources 101, 103 into the fiber 12B, the effective interaction length for the coupler should be adjusted to be an odd multiple of the coupling length at the wavelength of the pump sources 101, 103, i.e., 0.8 microns, and to be an even multiple of the signal frequency 1.06 microns. This will result in a complete coupling of the illumination from the pump sources 101, 103, from the fiber 12A into the fiber 12B, with essentially no coupling of the signal to be amplified from the fiber 12B to the fiber 12A. It will be understood, of course, that no coupling in this instance means an even number of complete couplings so that, for example, if the effective interaction length at the region 32 is twice the coupling length at 1.06 microns, the signal to be amplified will be coupled two complete times, once from the fiber 12B to the fiber 12A, and then from the fiber 12A to the fiber 12B. If this signal fiber enters the coupler at port C, as shown on the left of FIG. 11, it will exit uncoupled at port D. However, at port D, this signal to be amplified will coexist with light from the pumping source 101, which will be completely coupled from the fiber 12A to the fiber 12B.

Since light from the pumping sources 101,103 will be transmitted along the fiber 12B, after coupling, in the direction of the output ports D and C, respectively, this pumping illumination will invert the neodymium ions in the ND:YAG material which forms the fiber 12B. Thus, a signal, which is injected at either port C or port D, will be amplified in the manner previously described as it passes through the fiber 12B, since this signal will excite spontaneous lasing relaxation of the ND:YAG material of the fiber 12B, which lasing relaxation will provide light coherent with the signal to be amplified.

The amplifier of the present invention therefore provides a convenient means to transfer pumping illumination from the pump sources 101,103 by wavelength dependent coupling to the ND:YAG fiber 12B, while prohibiting coupling of the signal to be amplified from the fiber 12B to the fiber 12A.

In order to make the amplifier symmetrically bidirectional, the pump sources 101,103 should both be utilized, although it will be understood that, if such bidirectional symmetry is not necessary, either of the pump sources 101, 103 will invert ions within the ND:YAG material at one side of the coupler 10 and will thus yield gain for signals transmitted in either direction in the fiber 12B.

If only one of the pump sources 101, 103 is utilized, it should be recognized that the ND:YAG fiber 12B will not be uniformly illuminated. Thus, the inverted population of neodymium ions will not be uniformly distributed along the length of the fiber 12B. Because this non-uniform or non-symmetrical state within the amplifier will yield different gain for signals input at the port C, then for signals input at the port D (particularly when these signals occur simultaneously), it is advantageous to utilize the pair of sources 101, 103.

The phenomenon of dissimilar gain for signals traversing the fiber 12B in different directions with a non-symmetrical inversion population of neodymium ions occurs as follows. It will be recognized that, as a signal to be amplified propagates from the port C of the fiber 12B toward the port D, it will trigger the emission of stimulated photons within the ND:YAG fiber. Such triggering emission, of course, lowers the inversion population within the fiber 12B. If, for example, in a gyroscope, a pair of waves propagate simultaneously through the fiber 12B in opposite directions from the ports C and D, the signal input at the port C will deplete the inversion population adjacent to the port C before the signal input at the port D arrives at the left end of the fiber 12B, as viewed in FIG. 11. If the inversion population is higher at the left end of the fiber 14, then at the right end, as would be the case if only the pump source 103 were utilized, the signal input at port C will undergo a greater amplification, since it will deplete the inversion population before the signal which is input at the port D arrives at the high density left end.

It should also be recognized that the pumping illumination supplied by the pump sources 101, 103 should be sufficient, on a continuing basis, to replace the depleted population within the fiber 12B which occurs when the signals are amplified. Thus, for example, in a gyroscope where a pulse signal circulates through a kilometer of fiber, a counter-propagating signal will traverse the amplifier, shown in FIG. 11, approximately once each 5 microseconds. If continuous pump sources 101, 103 are used, they should provide sufficient output so that, during each 5-microsecond period, they are capable of reinverting the neodymium ion population which is relaxed during each successive traverse of the signals to reinvert a population equal to that which has relaxed, such that the amplification factor or gain of the amplifier will remain relatively constant.

As will be recognized from the above-description, a proper selection of fiber spacing and radius of curvature will yield a coupler which permits pumping sources 101, 103 to illuminate the fiber 12A and which permits this illumination to be coupled to the ND:YAG fiber 12B to invert the neodymium population therein. With a proper selection of the coupler parameters, the signal to be amplified is not coupled from the fiber 12B to the fiber 12A, and thus traverses the fiber 12B to be amplified by stimulating lasing relaxation of neodymium ions in the fiber 12B which produces light coherent with the signal to be amplified.

It should also be recognized that the apparatus of FIG. 11 will operate as a fiber optic laser source or oscillator, as well as an amplifier. For use as a source, the fiber 12B is terminated at port C with a fully reflective mirror and at port D with a mirror which reflects most, but not all, of the light traveling in the fiber 12B. When the apparatus is pumped, by the sources 101, 103, spontaneous lasing emission within the fiber 12B will initiate a coherent wavefront which will be reflected back and forth through the length of the fiber 12B, with a portion of the coherent wavefront exiting port D through the partially reflective end surface in the manner well known in laser technology.

If symmetrical pumping is not required, in a system, for example, where uniform amplification in two directions is not critical, it is possible to place the pumping source 101 at the port C so that the pumping source 101 directly illuminates the ND:YAG fiber 12B at the port C. In this situation, the input signal to be amplified is supplied to port A, and the coupler 10 is configured such that the interaction length is an even multiple of the coupling length at the wavelength of the pumping source 101, but an odd multiple of the coupling length at the frequency of the signal to be amplified, which is also the lasing frequency of the ND:YAG material. In this configuration, the coupler 10 will combine both the pumping signal and the signal to be amplified for transmission through the right-hand side of the fiber 12B of FIG. 11 for propagation toward the port D, and amplification of the signal would occur in the right-hand portion of the fiber 12B where both the signal to be amplified and the pumping illumination are combined.

It will also be recognized that, when the amplifier of FIG. 11 is to be incorporated into a fiber optic system, the ends of the fiber 12B at ports C and D will be polished and butted, or otherwise connected to a fiber optic member within the fiber optic system so that signals to be amplified can be supplied at one of the ports C,D and, after amplification, removed from the alternate port C or D.

What is claimed is:

1. A fiber optic device, comprising:
    a pair of single-mode optical fibers, having an inner core and an outer cladding, said fibers including respective facing surfaces formed on the cladding thereof, said facing surfaces juxtaposed to provide an interaction region having an interaction length, to cause evanescent field coupling between said fibers, one of said fibers doped with material which will lase to produce light at a first wavelength;
    means for supplying pumping illumination to one of said pair of fibers at a second wavelength and for supplying a signal to be amplified to the other of said pair of fibers at said first wavelength; and
    said pair of fibers having a wavelength-dependent coupling length at said interaction region, said interaction length being an even multiple of the coupling length at one of said first and second wavelengths and an odd multiple of the coupling length at the other of said first and second wavelengths.

2. A fiber optic device, as defined in claim 1, wherein said interaction length is an even multiple of the coupling length at the wavelength of said signal to be amplified and an odd multiple of the coupling length at the wavelength of said pumping illumination.

3. A fiber optic device, as defined in claim 1, wherein said one of said fibers comprises ND:YAG material.

4. A fiber optic device, as defined in claim 3, wherein said pumping illumination is at a wavelength at which said ND:YAG material exhibits high energy absorption.

5. A fiber optic device for supplying pumping illumination at a first optical wavelength to a material which will lase at a second optical wavelength, comprising:
    a light source for providing said pumping illumination at said first wavelength;
    a first single-mode optical fiber having an end portion coupled to said light source for receiving said pumping illumination at said first wavelength, and a second single-mode optical fiber having an end portion for receiving an optical signal at said second wavelength, one of said first and second fibers formed of material which will lase at said second optical wavelength, said fibers arranged in close proximity at an interaction region to provide evanescent field coupling therebetween; and
    the effective interaction length of said optical fibers at said interaction region being an even multiple of the coupling length of said fibers at one of said first and second optical wavelengths and an odd mulitple of the coupling length of said fibers at the other of said first and second optical wavelengths.

6. A fiber optic device, as defined in claim 5, wherein said first and second optical fibers are arcuately curved, and wherein said effective interaction length is a function of the radius of curvature of said arcuate fibers.

7. A fiber optic device, as refined in claim 5, wherein said first and second optical fibers are laterally offset from one another to select said first and second optical wavelengths.

8. A fiber optic device, as defined in claim 5, wherein said first and second optical fibers are arcuate and wherein the radius of said arcuate optical fibers is selected to define the frequency difference between said first and second optical wavelengths.

9. A fiber optic device, as defined in claim 5, wherein said fibers are arcuate and wherein said effective interaction length is a function of the square root of the radius of said arcuate fibers.

10. A fiber optic amplifier, comprising:
    first and second strands of single-mode fiber optic material, one of said strands formed of material which will lase, said first strand having an end portion for coupling said first strand to a source of a light signal to be amplified, said second strand having an end portion for coupling said second strand to a source of pumping illumination for said material which will lase; and
    means for accurately positioning said strands together in close facing relationship to form a planar region of interaction in which said light signal and said pumping illumination within said strands interact through their evanescent fields to cause one of said light signal and said pumping illumination to be transferred between the core portions of the strands an odd number of times, while the other of said light signal and said pumping illumination is transferred an even number of times.

11. A fiber optic amplifier, comprising:
    first and second strands of single mode fiber optic material having respective cores, said first strand having an end portion for coupling said first strand to a source of a signal to be amplified at a first optical frequency and said second strand having an end porfion for coupling said second strand to a source of pumping illumination at a second optical frequency, one of said strands formed of material which will lase at said first optical frequency when pumped with illumination at said second optical frequency; and means for accurately positioning said strands together in close facing relationship to form a region of interaction in which guided modes of the strand interact through their evanescent fields to cause light of one of said first and second frequencies to be transferred between said cores an odd number of times while causing light of the other of said first and second frequencies to be transferred between said cores an even number of times.

12. A fiber optic amplifier, as defined in claim 11, wherein said cores converge and diverge gradually at said region of interaction.

13. A fiber optic device, comprising:

a first single-mode optical fiber for receiving an optical signal to be amplified having a first wavelength, and a second single-mode optical fiber for receiving pumping illumination having a second wavelength;

one of said first and second single-mode optical fibers formed of a material which will lase to produce light of said first wavelength when pumped with light of said second wavelenght; and said first and second single-mode optical fibers juxtaposed to form an over-coupled evanescent interaction region between said first and second fibers at the point of said juxtaposition, the order of said over-coupling for one of said first and second wavelengths being even and the order of said over-coupling for the other of said first and second wavelengths being odd such that light of one of said wavelengths is transferred between the fibers an even number times and light of the other of said wavelengths is transferred an odd number of times.

14. A method of amplifying an optical signal, comprising:

providing first and second single mode optical fibers, said first and second fibers juxtaposed to form an interaction region for evanescent coupling between said single mode fibers, both of said fibers being arcuate, and including an inner core surrounded by an outer cladding, one of said fibers formed of a lasing material;

selecting the wavelength of said optical signal such that it is transparent to said lasing material;

selecting the wavelength of a pump optical signal such that it is at least proximate to a peak of the absorption spectrum of said lasing material to cause absorption of said pump optical signal by said lasing material;

selecting the radius of curvature of said arcuate fibers, the proximity of the cores of said fibers, and said wavelengths to provide a length for said interaction region and a coupling length for said juxtaposed fibers such that the interaction region length is equal to an even number of coupling lengths for one of said wavelengths and an odd number of coupling lengths for the other of said wavelengths;

inputting said pump optical signal to said second fiber to raise the energy level of atoms in said lasing material; and inputting said optical signal to said first fiber to stimulate emission of photons from said lasing material at the wavelength of said optical signal to cause amplification of said optical signal.

* * * * *